Patented Aug. 26, 1930

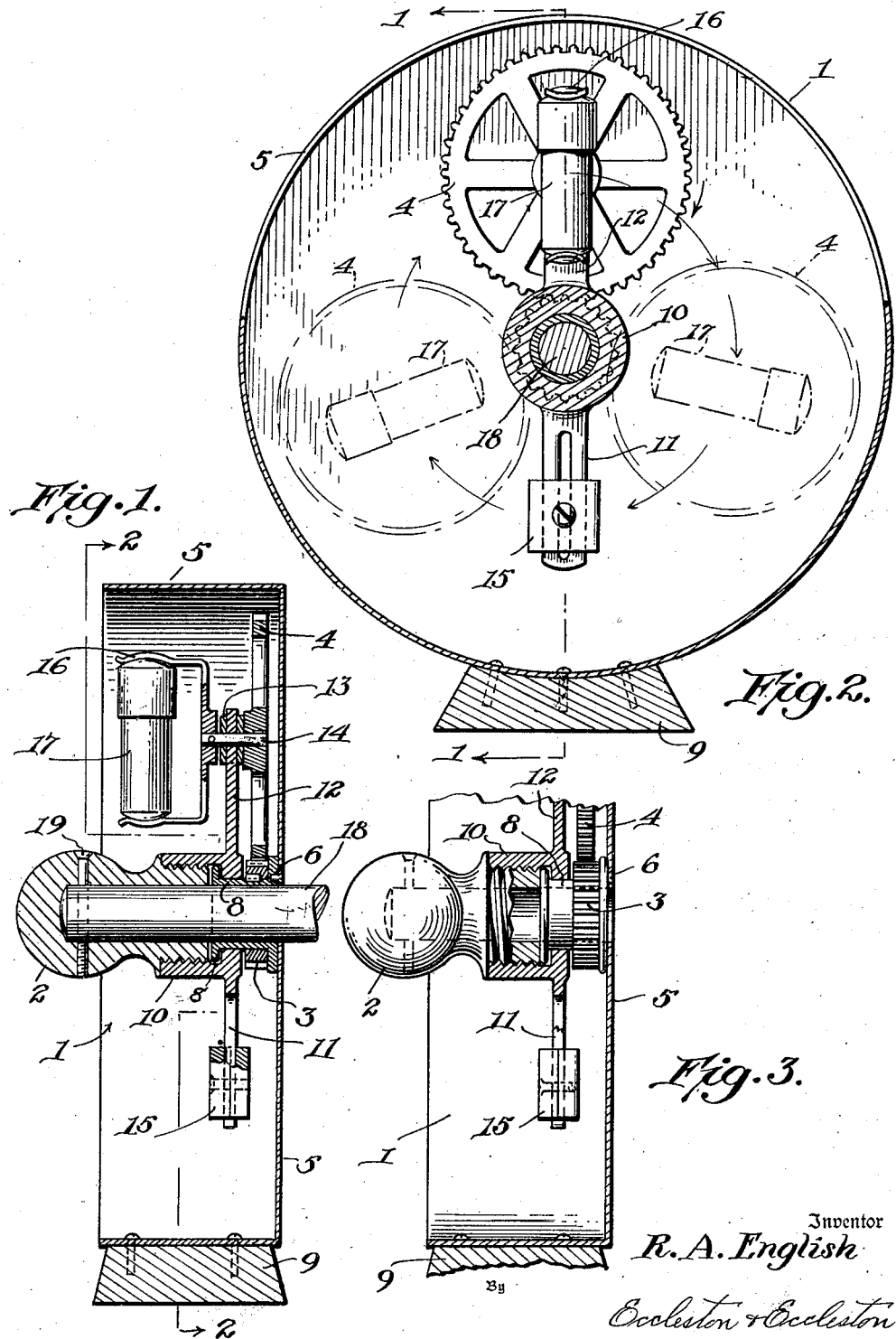

1,774,257

UNITED STATES PATENT OFFICE

RAYMOND A. ENGLISH, OF CLAY CITY, INDIANA

AMALGAMATOR AND THE LIKE

Application filed June 17, 1929. Serial No. 371,591.

This invention relates to devices for mixing amalgams, cements and other kindred substances, preferably for use by dentists, dental laboratories and metallurgical laboratories, and has for its primary object to provide such a device which may be operated from any ordinary laboratory lathe or motor, and which is comprised of few parts which are readily assembled into a unitary structure of comparatively low cost.

A further object of the invention resides in the perfection of an amalgamator, in which all the parts are contained in one unitary structure, which may be readily secured to the ordinary lathe, motor, or small shaft without the necessity of cutting key-ways, drilling holes or providing other extra equipment, and which will, therefore, operate at a maximum efficiency and a minimum of inconvenience.

Another object of the invention consists in providing a mechanically operated amalgamator or amalgam mixer, in which the parts of the amalgam are mixed by centrifugal force and by a rolling action producing a finished compound, very similar to that produced by the operator in rubbing the components together in his hand.

A further object resides in combining with the amalgamator, a collapsible capsule in which the various substances required would be mixed together to produce such amalgams or cements, which may be filled at any time and with exactly the correct amounts and which may be inserted for immediate use, thereby, insuring a perfect product.

Other objects and advantages of the invention will be apparent from the following description taken in connection with the accompanying drawing; in which Figure 1 is a vertical sectional view taken on line 1—1 of Figure 2.

Figure 2 is a vertical sectional view taken on line 2—2 of Figure 1, and showing in dotted lines the various positions assumed by the capsule.

Figure 3 is an enlarged detail sectional view of the gearing and connections.

Referring to the drawing in greater detail the numeral 1 indicates generally the apparatus which includes a chuck 2, a pinion or drive gear 3, a driven gear 4, a shield 5, and other parts which will be described in order.

The spur gear 3 is fixed by a key or other equivalent means to a hollow shaft 8 which shaft is in turn fixed to the back plate or disc of the shield 5 by any conventional means such as a screw 6. This shield is provided with a depending weight 9 which tends to maintain the same stationary when the device is in operation.

Hollow shaft 8, which is provided with a flange 8', serves as a bearing for a threaded collar 10 and to this collar is fixed the aligned arms 11 and 12 extending in diametrically opposite directions. On the arm 12 is secured a bearing 13 for shaft 14, and the arm 11 carries an adjustable counterweight 15. On the inner end of shaft 14 is keyed the gear wheel 4 and which meshes with the stationary spur gear 3. The opposite end of shaft 14 carries a U-shaped spring clip 16 adapted to receive a capsule or the like 17 in which is contained the materials to be mixed.

The chuck 2 is fastened to a drive shaft 18 by means of screw 19 or any other type of fastening means, and it will be apparent therefore, that the entire assembly heretofore described may be slipped over the shaft as a unit and then fixed thereto by the mere insertion of the screw or other conventional anchoring means. This shaft may form a part of a lathe, small motor or similar mechanisms common to laboratories.

In the operation of the device the spur gear 3 will remain stationary, or substantially so, by reason of the weight 9 which is attached to the shield 5, although various other means may be employed for this purpose. While in the drawing a definite ratio between the gear 3 and the gear wheel 4 is necessarily indicated, it is to be understood that any preferred gear ratio may be employed. The receptacle 17 containing the material to be mixed is placed in the clip 16 and the device started in operation. The rotation of the receptacle about its axis 14 will cause a tumbling and sliding action of the material, while a centrifugal force will be applied to the material by reason of its bodily movement about axis 18. These several forces applied to the material simulate the method of mixing by rolling the material between the hands of an operator, thereby performing mechanically a process commonly done by hand, and with equal perfection.

The device is of simple and inexpensive construction and may be readily set up for use as heretofore described. Furthermore, by a proper adjustment of the counter-weight 15 along the arm 11 the vibration of the apparatus may be reduced to a minimum.

From the foregoing description considered in connection with the drawing it will be apparent that I have provided a fairly simple and inexpensive construction of mixer which may be readily applied to and removed from any available power shaft; that the device is designed to more nearly simulate the movement in mixing by hand; and that by reason of the use of a spring clip for gripping the container, the material to be mixed is more easily associated with the mixing apparatus and more readily removed therefrom when the mixing process is completed.

In accordance with the patent statutes I have described what I now believe to be the preferred form of the invention, but inasmuch as the structure disclosed may be varied as to details of construction without departing from the spirit of the invention, it is intended that the drawing be considered as merely illustrative of the invention rather than in a limiting sense, and that minor variations in details of construction be included within the scope of the appended claims.

Having fully described my invention, what I claim as new and desire to secure by Letters Patent is:

1. A device of the class described including a main shaft, an arm mounted for rotation with said shaft, a stub shaft rotatably mounted in said arm, means on said stub shaft for gripping a receptacle, and gearing for causing said stub shaft to rotate about its axis through the rotation of said arm by the main shaft.

2. A device of the class described including a main shaft, an arm mounted for rotation with said shaft, a stub shaft rotatably mounted in said arm, a counter-balance weight for said arm and stub shaft, means on said stub shaft for gripping a receptacle, and gearing for causing the stub shaft to rotate about its axis through the rotation of said arm by the main shaft.

3. A device of the class described including a main shaft, an arm mounted for rotation with said shaft, a stub shaft rotatably mounted in said arm, a spring clip carried by the stub shaft and adapted to grip a receptacle, and gearing for causing said stub shaft to rotate about its axis through the rotation of said arm by the main shaft.

4. A device of the class described including a main shaft, a shield non-rotatably mounted on said shaft, a spur gear fixed to said shield, an arm carried by said shaft, a stub shaft rotatably mounted on said arm, a gear wheel fixed to the stub shaft and in mesh with said spur gear, and means also on said stub shaft for supporting a receptacle.

5. A device of the class described including a main shaft, a shield mounted on said shaft, means on said shield for maintaining said shield against rotation, an arm carried by said shaft, a stub shaft rotatably mounted on said arm, means on said stub shaft for supporting a receptacle, and intermeshing gears on said stub shaft and shield respectively, whereby the stub shaft is caused to rotate about its axis as it revolves bodily about said main shaft.

6. A device of the class described including a main shaft, a shield loosely mounted on said shaft, a weight for maintaining said shield against rotation, an arm mounted for rotation with said shaft, a stub shaft rotatably mounted in said arm, means on said stub shaft for gripping a receptacle, and gearing for causing said stub shaft to rotate about its axis as said arm is rotated by the main shaft.

RAYMOND A. ENGLISH.